Dec. 3, 1963     T. A. BURNS     3,112,948
REMOVABLE PAN LIFTER AND HANDLE
Filed April 25, 1960

INVENTOR.
BY THAGRUS A. BURNS
ATTORNEY

United States Patent Office 3,112,948
Patented Dec. 3, 1963

3,112,948
REMOVABLE PAN LIFTER AND HANDLE
Thagrus A. Burns, 2216 Butler Road, Fort Wayne, Ind.
Filed Apr. 25, 1960, Ser. No. 24,495
1 Claim. (Cl. 294—27)

This invention relates in general to a removable pan lifter and handle for containers or pans used in food handling operations wherein it is necessary to push or pull the pans into high temperature areas, such as ovens, pressure cookers or steam table wells.

The present methods for handling food containers and pans are to use conventional hot pads, rags or bare hands for gripping the edges or rims of the pans or containers. In using hot pads, rags or bare hands, the operator has to render great care to avoid contact of these three means with the food in the pans, is unable to obtain a firm safe grip on the pan being handled and further may lose control or become injured while handling the container because of possible heat transfer. In general, all known present methods for handling standard steam table pans and containers are unsanitary, unsightly and dangerous.

It is one of the primary objects of this invention to provide a removable handle which will eliminate the above undesirable features and which has a high resistance to heat transfer.

It is a further object of this invention to provide a handle having a raised portion to permit the gripping surface and hand support to be raised above the rim of the pan to permit the lowering of the pan into, or removing the pan from the steam table well or oven or pressure cooker without the danger of burning the operators' hand.

A salient object of this invention is to provide a sanitary removable handle made from a unitary piece of stainless steel which is neat in appearance and has sufficient strength and durability for use with pans or trays that are to be placed into or removed from high temperature areas.

Other objects and features of the invention will become apparent from the following description which proceeds with reference to the accompanying drawing wherein.

Figures 1, 2:
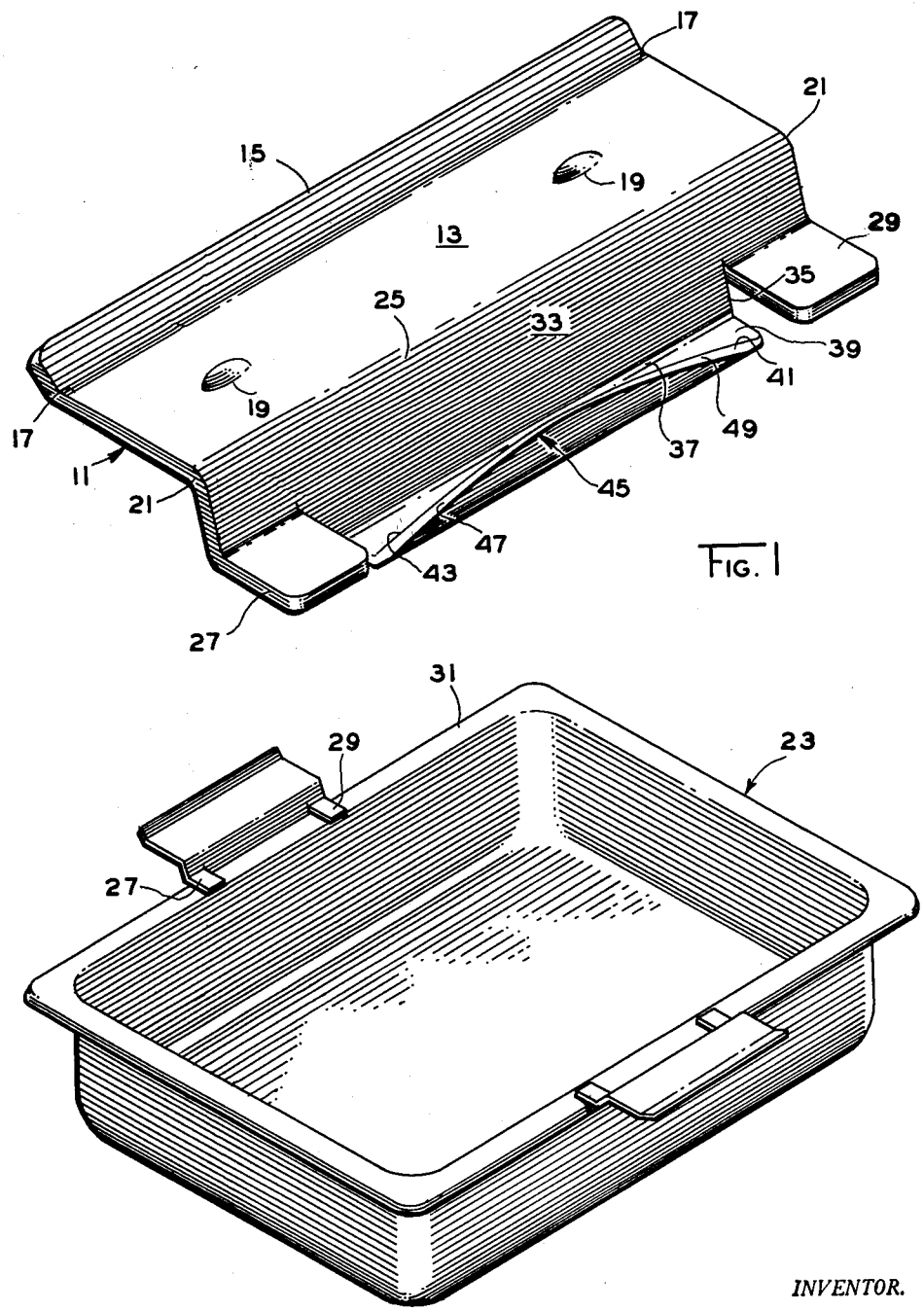
FIGURE 1 is a perspective view illustrating the removable handle.
FIGURE 2 is a perspective view showing a pair of the removable handles illustrated in FIGURE 1 attached to a steam table pan.

Referring to FIGURE 1, the reference numeral 11 designates the removable pan lifter and handle having an elongated section or portion 13 with its outer edge 15 bent upwardly at 17 to provide a curved gripping surface and hand support. The member 13 may be provided with gripping holes 19 for accommodating an operator's fingers.

The member 13 is bent downwardly at 21 to provide an offset 25 which permits the gripping surface and hand support portion to be raised above the pan 23 a slight distance to permit the pan to be lowered into a steam table well without burning the hand of the operator. This offset portion 25 also lowers the center of gravity of the pan with respect to the curved gripping surface and hand support.

A pair of flanges or lips 27 and 29 are provided by bending a portion outwardly from the offset portion 25 to substantially the same plane as the elongated member 13. The two flanges are adapted to be placed on top of the rim 31 of the pan as illustrated in FIGURE 2. The flanges serve as the first leverage point of the handle in holding the pan firmly.

The intermediate portion 33 extends downwardly and beyond the flanges 27 and 29 as illustrated at 35. The intermediate section 33 is bent outwardly at 37 to form a support 39 which is bent upwardly at 41 and 43 to form a support or flange 45. The supports 39 and 45 are adapted to be placed on the underneath side of the rim 31 and serve as the second leverage point required to hold the pan firmly.

The flange 45 is tapered or ground at 47 and 49 to provide a smooth and thin area for breaking the seal between the rim 31 and the steam table when it is desired to lift the pan out of the steam table well.

When the operator desires to use the handles, one is taken in each hand, and the flanges 27 and 29 are placed on top of the rim 31 of the pan 23 and the flange 45 is placed underneath the rim 31. As the handles are raised upwardly, the flanges serve as a first leverage point, and the flange 45 serves as a second leverage point, thus clamping the pan tightly so that it may be transferred to the area desired. The handles may be removed by simply pushing them downwardly and moving them outwardly which disengages them from the rim 31.

While the invention has been illustrated by means of a single example embodiment of the invention, it will be understood that this is illustrative of the invention and in no sense restrictive thereof. Those skilled in the art can be expected to make numerous adaptations and revisions of the invention as suit particular design requirements. It is intended that such revisions and changes of the invention as incorporate the herein disclosed principles will be included within the scope of the following claim as equivalents of the invention.

I claim:

A removable pan handle for steam table pans comprising:

(a) an elongated body portion having one edge turned upwardly and outwardly with respect to the main part of the body portion to form a gripping surface and hand support, (b) said body portion having the other opposite edge turned downwardly and outwardly with respect to the main part of the body portion whereby said main body portion is disposed above and away from a pan carried thereby, (c) said opposite edge comprising a pair of laterally spaced lips extending laterally and outwardly from said body portion, said lips adapted to be placed over the top of the pan rim, said laterally spaced lips serving as a first leverage point, (d) said opposite edge having an intermediate portion between the laterally spaced lips and extending downwardly from the laterally spaced lips, said intermediate portion having a laterally outwardly disposed flange, the outer edge of said flange rising from its extremities upwardly to an intermediate peak, said flange adapted to fit under the pan rim to serve as a second leverage point, (e) said flange having its edge tapered to provide a smooth and thin area for breaking the seal between the rim and steam table, and (f) whereby the two spaced lips and flange are adapted to clamp to the rim of the pan so that the pan can be raised or lowered to the desired position and thereafter be removed from the pan.

References Cited in the file of this patent

UNITED STATES PATENTS

| | | |
|---|---|---|
| 572,815 | Nicholes | Dec. 8, 1896 |
| 2,211,030 | Rutenber | Aug. 13, 1940 |
| 2,574,411 | Pashby | Nov. 6, 1951 |

FOREIGN PATENTS

| | | |
|---|---|---|
| 80,976 | Norway | Nov. 3, 1952 |
| 82,775 | Netherlands | Sept. 15, 1956 |
| 126,301 | Australia | Dec. 15, 1947 |
| 272,789 | Switzerland | Apr. 2, 1951 |
| 339,007 | Great Britain | Dec. 4, 1930 |
| 449,158 | Italy | June 6, 1949 |
| 680,932 | Great Britain | Oct. 15, 1952 |
| 858,593 | Germany | Dec. 8, 1952 |